United States Patent
Yuki et al.

(10) Patent No.: US 11,781,596 B2
(45) Date of Patent: Oct. 10, 2023

(54) BEARING COMPONENT AND METHOD FOR MANUFACTURING THE SAME

(71) Applicant: NTN Corporation, Osaka (JP)

(72) Inventors: Hiroshi Yuki, Kuwana (JP); Miyu Sato, Kuwana (JP); Chikara Ohki, Kuwana (JP)

(73) Assignee: NTN CORPORATION, Osaka (JP)

( * ) Notice: Subject to any disclaimer, the term of this patent is extended or adjusted under 35 U.S.C. 154(b) by 440 days.

(21) Appl. No.: 16/474,525

(22) PCT Filed: Dec. 5, 2017

(86) PCT No.: PCT/JP2017/043640
§ 371 (c)(1),
(2) Date: Jun. 27, 2019

(87) PCT Pub. No.: WO2018/123469
PCT Pub. Date: Jul. 5, 2018

(65) Prior Publication Data
US 2019/0338808 A1 Nov. 7, 2019

(30) Foreign Application Priority Data

Dec. 28, 2016 (JP) .................................. 2016-256637
Dec. 28, 2016 (JP) .................................. 2016-256638

(51) Int. Cl.
*C21D 9/40* (2006.01)
*F16C 33/64* (2006.01)
(Continued)

(52) U.S. Cl.
CPC .............. *F16C 33/64* (2013.01); *C21D 6/004* (2013.01); *C21D 6/005* (2013.01); *C21D 6/008* (2013.01);
(Continued)

(58) Field of Classification Search
CPC .................................................... C22C 38/44
See application file for complete search history.

(56) References Cited

U.S. PATENT DOCUMENTS 6,194,088 B1 * 2/2001 Yoshida .................. C23C 26/00
148/530
6,565,677 B1 5/2003 Takemura et al.
(Continued)

FOREIGN PATENT DOCUMENTS

CN 106661644 A 5/2017
EP 1808499 A1 7/2007
(Continued)

OTHER PUBLICATIONS

Nsk.com. 2022. Technical Report | Bearing Library | Technical Support | NSK Global</i>. [online] Available at: <https://www.nsk.com/services/basicknowledge/technicalreport/10materials.html> [Accessed Mar. 25, 2022]. (Year: 2022).*
(Continued)

*Primary Examiner* — Jophy S. Koshy
(74) *Attorney, Agent, or Firm* — McDermott Will & Emery LLP

(57) ABSTRACT

In one aspect of the present invention, a method for manufacturing a bearing component includes: a preparation step of preparing a ring-shaped member of steel having a radially inner surface, a radially outer surface, and a thickness which is a distance between the radially inner surface and the radially outer surface; and a heat treatment step of performing a heat treatment to locally heat one of the radially inner surface and the radially outer surface to a heat treatment temperature and subsequently cool the one of the radially inner surface and the radially outer surface, the method satisfying $S \geq 930/(0.3477 \ W^2 - 1.594 \ W - 0.804)$, where $S$ represents an average temperature increasing rate (unit: ° C./sec) applied when the surface is heated and $W$ represents the thickness (unit: mm).

6 Claims, 5 Drawing Sheets

(51) Int. Cl.

| | |
|---|---|
| *C21D 6/00* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *F16C 33/58* | (2006.01) |
| *F16C 33/62* | (2006.01) |
| *C21D 1/25* | (2006.01) |
| *C21D 1/42* | (2006.01) |

(52) U.S. Cl.
CPC .............. *C21D 9/40* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *F16C 33/583* (2013.01); *F16C 33/62* (2013.01); *C21D 1/25* (2013.01); *C21D 1/42* (2013.01); *F16C 2204/66* (2013.01); *F16C 2204/70* (2013.01); *F16C 2223/10* (2013.01)

(56) References Cited

U.S. PATENT DOCUMENTS

| | | |
|---|---|---|
| 2503/0089428 | 5/2003 | Murakami et al. |
| 2013/0301969 A1 | 11/2013 | Yuki et al. |
| 2015/0319810 A1 | 11/2015 | Doyon et al. |
| 2016/0208854 A1 | 7/2016 | Miwa et al. |
| 2017/0081738 A1 | 3/2017 | Flodstrom et al. |

FOREIGN PATENT DOCUMENTS

| | | |
|---|---|---|
| EP | 3315619 A1 | 5/2018 |
| JP | 2000-328203 A | 11/2000 |
| JP | 2005-133159 A | 5/2005 |
| JP | 2009-270172 A | 11/2009 |
| JP | 2010-25311 A | 2/2010 |
| JP | 2014-34715 A | 2/2014 |
| WO | 2012/098988 A1 | 7/2012 |
| WO | 2015/034044 A1 | 3/2015 |
| WO | 2015/199599 A1 | 12/2015 |

OTHER PUBLICATIONS

Chinese Office Action issued in corresponding Chinese Patent Application No. 201780081254.2, dated Sep. 29, 2020, with English translation.

Hiroshi Yuki et al., "Influence of Induction Heating Conditions on Bearing Steel Characteristics," NTN Technical Review, Oct. 20, 2015, No. 83, pp. 75-80, with English abstract.

International Search Report issued in corresponding International Patent Application No. PCT/JP2017/043640, dated Mar. 13, 2018, with English translation.

Yuki Hiroshi, "Influence of Induction Heating Conditions on Bearing Steel Characteristics," NTN Technical Review, Oct. 20, 2015, pp. 75-80, XP055512874.

Extended European Search Report issued in corresponding European Patent Application No. 17886807.1, dated Jul. 23, 2020.

\* cited by examiner

BEARING COMPONENT AND METHOD FOR MANUFACTURING THE SAME

CROSS-REFERENCE TO RELATED APPLICATIONS

This application is the U.S. National Phase under 35 U.S.C. § 371 of International Application No. PCT/JP2017/043640, filed on Dec. 5, 2017, which claims the benefit of Japanese Application No. 2016-256637, filed Dec. 28, 2016, and Japanese Application No. 2016-256638, filed on Dec. 28, 2016, the entire contents of each are hereby incorporated by reference.

TECHNICAL FIELD

The present invention relates to a bearing component and a method for manufacturing the same.

BACKGROUND ART

A rolling bearing has a bearing ring and rolling elements. The bearing ring is composed of an inner ring and an outer ring. The inner ring is disposed on a radially inner side of the outer ring. The rolling elements are disposed between the inner ring and the outer ring.

While conventional art relevant to the present invention has been described above based on general information in the art that the Applicant has acquired, insofar as the Applicant recalls, the Applicant does not have information to be disclosed as documentary prior art information available before the present application was filed.

SUMMARY OF INVENTION

Technical Problem

For a bearing ring (for example, an inner ring), hoop stress (tensile stress in the circumferential direction of the inner ring) may occur. If excessive hoop stress acts on the bearing ring, it causes cracking in the bearing ring. In order to suppress a crack resulting from excessive hoop stress, it is effective to previously impart compressive residual stress to a raceway surface of the bearing ring.

In principle, compressive residual stress can be imparted to a raceway surface of a bearing ring by performing surface hardening (or quenching only a surface). When a thin bearing ring is used, however, not only a surface heated but a surface opposite thereto is also easily hardened, and it is thus difficult to implement surface hardening. Therefore, generally, compressive residual stress is not imparted to a raceway surface of an inner ring. This is because, conventionally, appropriate conditions for surface hardening have not been clarified.

The present invention has been made in view of the above issue in conventional art. More specifically, a bearing component which can suppress cracking and the like caused by hoop stress, and a method for manufacturing the same, are provided.

Solution to Problem

According to one aspect of the present invention, a bearing component comprises a ring-shaped steel member having a radially inner surface and a radially outer surface. The ring-shaped member has a quench-hardened layer in only one of the radially inner surface and the radially outer surface.

According to one aspect of the present invention, a method for manufacturing a bearing component comprises: a preparation step of preparing a ring-shaped member of steel having a radially inner surface, a radially outer surface, and a thickness which is a distance between the radially inner surface and the radially outer surface; and a heat treatment step of performing a heat treatment to locally heat one of the radially inner surface and the radially outer surface to a heat treatment temperature and subsequently cool the one of the radially inner surface and the radially outer surface, the method satisfying $S \geq 930/(0.3477 W^2 - 1.594 W - 0.804)$, where S represents an average temperature increasing rate applied when the surface is heated (unit: °C./sec) and W represents the thickness (unit: mm).

Advantageous Effects of Invention

The bearing component and method for manufacturing the same according to one aspect of the present invention can suppress cracking or the like caused by hoop stress.

DESCRIPTION OF EMBODIMENTS

Hereinafter reference will be made to the drawings to describe embodiments. In the figures, any identical or equivalent component is identically denoted and the component will not be described redundantly.

First Embodiment

Figure 1:
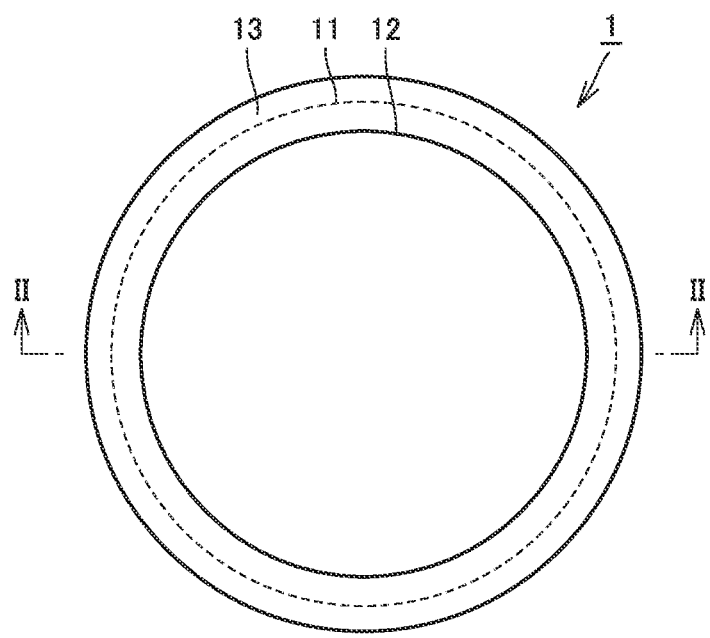
FIG. 1 is a plan view of a bearing component according to a first embodiment.
Figure 2:
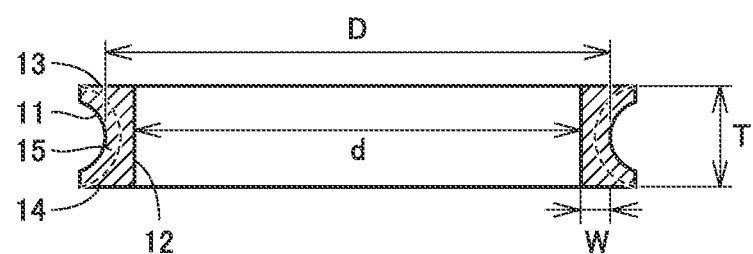
FIG. 2 is a cross section taken along a line II-II shown in FIG. 1.

Hereinafter, a configuration of a bearing component according to a first embodiment will be described. FIG. 1 is a plan view of a bearing component according to the first embodiment. FIG. 2 is a cross section taken along a line II-II shown in FIG. 1. As shown in FIGS. 1 and 2, the bearing component according to the first embodiment is, for example, an inner ring of a rolling bearing. However, the bearing component according to the first embodiment is not limited thereto. The bearing component according to the first embodiment may be an outer ring of a rolling bearing.

The bearing component according to the first embodiment has a ring-shaped member 1. Ring-shaped member 1 is made of steel. Further, the steel composing ring-shaped member 1 is, for example, high carbon chromium bearing steel. High carbon chromium bearing steel is a type of steel specified in JIS 4805:2008.

Ring-shaped member 1 has a radially outer surface 11, a radially inner surface 12, a top surface 13 and a bottom surface 14. Radially outer surface 11 is a surface of ring-shaped member 1 located on a radially outer side. Radially inner surface 12 is a surface of ring-shaped member 1 located on a radially inner side. Top surface 13 is a surface of ring-shaped member 1 perpendicular the axis of ring-shaped member 1. Bottom surface 14 is a surface facing away from top surface 13.

Ring-shaped member 1 has an outer diameter D and an inner diameter d. Outer diameter D is measured at a location where radially outer surface 11 and radially inner surface 12 have a smallest distance therebetween. Ring-shaped member 1 has a thickness W and a width T. Thickness W is a minimum value of a distance between radially outer surface 11 and radially inner surface 12. From a different point of view, thickness W has a value obtained by dividing a difference between outer diameter D and inner diameter d by two. Width T is a distance between top surface 13 and bottom surface 14.

Thickness W is preferably 5 mm or more. Thickness W is preferably 100 mm or less.

Ring-shaped member 1 has a quench-hardened layer 15. Quench-hardened layer 15 is formed only in one of radially outer surface 11 and radially inner surface 12 of ring-shaped member 1 and is not formed in the other. When the bearing component according to the first embodiment is an inner ring of a rolling bearing, quench-hardened layer 15 is formed only on the side of radially outer surface 11 of ring-shaped member 1 and is not formed on the side of radially inner surface 12 of ring-shaped member 1.

Quench-hardened layer 15 is a layer in which the steel constituting ring-shaped member 1 is martensitized. Whether quench-hardened layer 15 is formed can be determined through structure observation. Quench-hardened layer 15 preferably has a carbide area ratio of 8% or more and 12% or less. A carbide area ratio is measured by applying image-processing to an image captured through a microscope.

Figure 3:
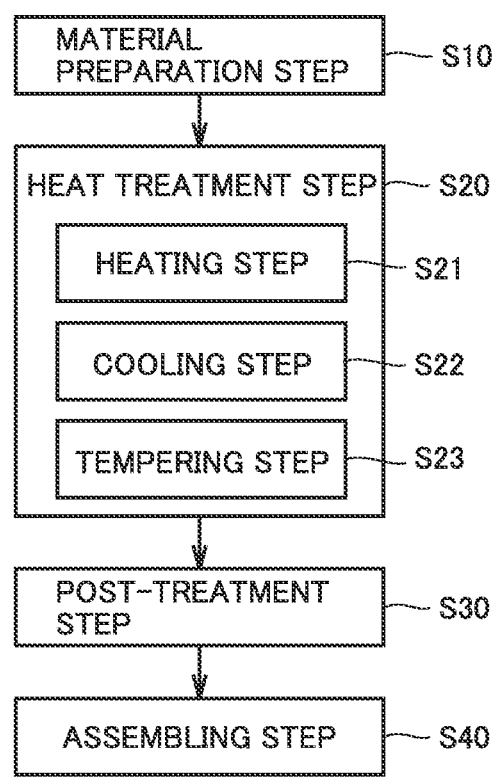
FIG. 3 is a flow chart of a method for manufacturing a bearing component according to the first embodiment.

Hereinafter, a method for manufacturing a bearing component according to the first embodiment will be described. FIG. 3 is a flow chart of the method for manufacturing a bearing component according to the first embodiment. As shown in FIG. 3, the method for manufacturing a bearing component according to the first embodiment comprises a material preparation step S10 and a heat treatment step S20. The method for manufacturing a bearing component according to the first embodiment may further comprise a post-treatment step S30. The method for manufacturing a bearing component according to the first embodiment may further comprise an assembling step S40.

In the method for manufacturing a bearing component according to the first embodiment, initially, material preparation step S10 is performed. In material preparation step S10, a workpiece of steel is prepared. The workpiece is, for example, a member of steel to be a bearing component such as a bearing's outer ring, inner ring, or the like. The workpiece is ring-shaped member 1. The steel used for the workpiece is, for example, high carbon chromium bearing steel.

Subsequently, heat treatment step S20 is performed. Heat treatment step S20 includes a heating step S21 and a cooling step S22. In heat treatment step S20, initially, heating step S21 is performed. In heat treatment step S20, cooling step S22 is performed after heating step S21 is performed. Heat treatment step S20 may further include a tempering step S23. Tempering step S23 is performed after cooling step S22.

In heat treatment step S20, ring-shaped member 1 is heated. Ring-shaped member 1 is locally heated. Ring-shaped member 1 is heated on the side of one of radially outer surface 11 and radially inner surface 12. For example, when a bearing component manufactured in the method for manufacturing a bearing component according to the first embodiment is an inner ring of a rolling bearing, ring-shaped member 1 is heated on the side of radially outer surface 11.

Locally heating ring-shaped member 1 means that only a vicinity of a surface of ring-shaped member 1 is a region that is heated. Ring-shaped member 1 can be locally heated in any conventionally well-known method. More specifically, ring-shaped member 1 can be locally heated for example by using induction heating, laser irradiation, electric heating, or the like. Preferably, ring-shaped member 1 is locally heated through induction heating.

A temperature in the region that is heated is referred to as a heat treatment temperature. Note that the heat treatment temperature as referred to herein means a surface temperature of a portion of ring-shaped member 1 that is being heated. The heat treatment temperature can be measured using, for example, a radiation thermometer or the like. The heat treatment temperature is only required to be a temperature equal to or higher than an $A_1$ point. The heat treatment temperature may be a temperature equal to or higher than an $A_3$ point. The heat treatment temperature is preferably 900° C. or higher and 1000° C. or lower.

Herein, the $A_1$ point is a temperature at which steel starts austenitization, and the $A_3$ point is a temperature at which steel is completely austenitized.

Ring-shaped member 1 is heated at an average temperature increasing rate S. Average temperature increasing rate S is a value obtained by dividing the heat treatment temperature by a time required to reach the heat treatment temperature from room temperature. Average temperature increasing rate S can be controlled for example by using a means for measuring the workpiece's temperature and a PLC (a programmable logic controller). Average temperature increasing rate S (unit: ° C.) and thickness W of ring-shaped member 1 (unit: mm) satisfy a relationship of $S \geq 930/(0.3477 W^2 - 1.594 W - 0.804)$. The relationship between average temperature increasing rate S and thickness W of ring-shaped member 1 is derived through an electromagnetic field heat conduction analysis.

In heat treatment step S20, after the heat treatment temperature is reached, ring-shaped member 1 is held in that condition for a prescribed period of time (hereinafter referred to as a soaking time). The soaking time is preferably a time required for radially outer surface 11 of ring-shaped member 1 to attain a carbide area ratio of 8% or more and 12% or less. Specifically, the soaking time is preferably 2 seconds or more and 200 seconds or less.

In cooling step S22, ring-shaped member 1 is cooled. Ring-shaped member 1 is cooled using any conventionally well-known refrigerant. The refrigerant used for cooling ring-shaped member 1 is, for example, oil or water.

In cooling step S22, ring-shaped member 1 may be cooled for example to a temperature equal to or lower than an $M_S$ point. The $M_S$ point is a temperature at which austenitized steel starts martensitization when the steel is cooled. This forms quench-hardened layer 15 in a surface of ring-shaped member 1 on the side of the heated region.

When average temperature increasing rate S (unit: °C.) and thickness W of ring-shaped member 1 (unit: mm) satisfy the relationship of $S \geq 930/(0.3477 \; W^2 - 1.594 \; W - 0.804)$, quench-hardened layer 15 is not formed in a surface facing away from the surface on the side of the heated region.

In tempering step S23, ring-shaped member 1 is tempered. Ring-shaped member 1 is tempered in a conventionally known method. That is, ring-shaped member 1 is tempered as follows: ring-like member 1 is heated to a prescribed temperature equal to or lower than the $A_1$ point (hereinafter also referred to as a tempering temperature) and held at the tempering temperature for a prescribed period of time (hereinafter referred to as a tempering duration).

Subsequently, a post-treatment step S30 is performed. In post-treatment step S30, ring-shaped member 1 undergoes a post-treatment. In post-treatment step S30, for example, ring-shaped member 1 is cleaned, and ground, polished or similarly machined or the like. Thus, a bearing component according to the first embodiment is manufactured.

Furthermore, an assembling step S40 is performed. In assembling step S40, the bearing component according to the first embodiment is assembled. More specifically, a bearing is manufactured by assembling the bearing component according to the first embodiment.

Hereinafter will be described a result of a test evaluating a relationship which average temperature increasing rate S and thickness W of ring-shaped member 1 have with whether surface hardening is implemented.

(1) Sample

In this test a sample was used which was ring-shaped member 1 made of SUJ2 specified in JIS 4805:2008. Ring-shaped member 1 used in this test had outer diameter D of 76 mm, inner diameter d of 60 mm, width T of 15 mm, and thickness W of 8 mm.

(2) Heat Treatment Conditions

As heat treatment conditions, a first heat treatment condition and a second heat treatment conditions were applied. The heating method, the heat treatment temperature and the soaking time were the same between the first and second heat treatment conditions.

More specifically, the sample was heated through induction heating. The induction heating was performed on the side of radially outer surface 11 of ring-shaped member 1. The induction heating was performed with a current having a frequency of 80 Hz. The heat treatment temperature was set to 950° C. Ring-shaped member 1 was held at the heat treatment temperature until radially outer surface 11 of ring-shaped member 1 attained a carbide area ratio of about 9%. Specifically, the soaking time was 9 seconds.

Note, however, that average temperature increasing rate S was different between the first heat treatment condition and the second heat treatment condition. Specifically, for the first heat treatment condition, average temperature increasing rate S was set to 160° C./second. For the second heat treatment condition, average temperature increasing rate S was set to 70° C./second.

In this test, ring-shaped member 1 has thickness W of 8 mm, as has been described above, and accordingly, when applied to the above relational expression between average temperature increasing rate S and thickness W, the first heat treatment condition satisfies the relational expression whereas the second heat treatment condition does not.

(3) Test Result

As a test result, whether quench-hardened layer 15 was present or absent on the side of radially inner surface 12 of ring-shaped member 1 was evaluated. Whether quench-hardened layer 15 was present or absent was evaluated through structure observation. When the first heat treatment condition was applied, quench-hardened layer 15 was not formed on the side of radially inner surface 12 of ring-shaped member 1. That is, surface hardening was implemented.

In contrast, when the second heat treatment condition was applied, quench-hardened layer 15 was formed on the side of radially inner surface 12 of ring-shaped member 1. That is, surface hardening was not implemented. From such test results, it has also been confirmed through an experiment that when the above relational expression between average temperature increasing rate S and thickness W is satisfied, surface hardening of ring-shaped member 1 is implemented, otherwise surface hardening of ring-shaped member 1 is not implemented.

Hereinafter, an effect of the bearing component according to the first embodiment and the method for manufacturing the same will be described. In the bearing component according to the first embodiment, quench-hardened layer 15 is formed only on the side of one of radially outer surface 11 and radially inner surface 12 of ring-shaped member 1. As quench-hardened layer 15 is formed, the portion of the layer expands in volume. The expansion, however, is restrained by a portion where quench-hardened layer 15 is not formed. As a result, compressive residual stress acts on quench-hardened layer 15. Thus, according to the bearing component according to the first embodiment, cracking or the like attributed to hoop stress can be suppressed by the compressive residual stress acting on quench-hardened layer 15.

According to the method for manufacturing a bearing component according to the first embodiment, quench-hardened layer 15 is formed only on the side of one of radially outer surface 11 and radially inner surface 12 of ring-shaped member 1. Therefore, according to the method for manufacturing a bearing component according to the first embodiment, a bearing component which suppresses cracking or the like attributed to hoop stress can be manufactured.

Second Embodiment

Figure 4:
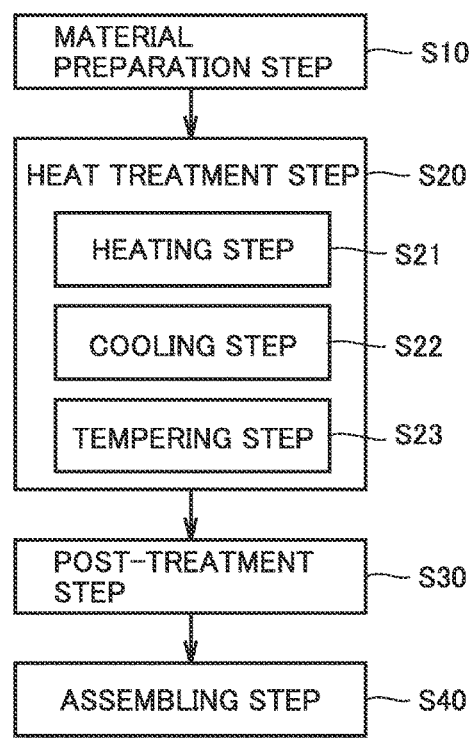
FIG. 4 is a flow chart of a method for manufacturing a bearing component according to a second embodiment.

Hereinafter, a bearing component according to a second embodiment and a method for manufacturing the same will be described. FIG. 4 is a flow chart of the method for manufacturing a bearing component according to the second embodiment. As shown in FIG. 4, the method for manufacturing a bearing component according to the second embodiment comprises material preparation step S10 and heat treatment step S20. The method for manufacturing a bearing component according to the second embodiment may further comprise post-treatment step S30. The method for manufacturing a bearing component according to the second embodiment may further comprise assembling step S40.

In the method for manufacturing a bearing component according to the second embodiment, initially, material preparation step S10 is performed. In material preparation step S10, a workpiece of steel is prepared. The workpiece is, for example, a member of steel to be a bearing component such as a bearing's outer ring, inner ring, or the like. The steel used for the workpiece is, for example, high carbon chromium bearing steel. High carbon chromium bearing steel is a type of steel specified in JIS 4805:2008.

Subsequently, heat treatment step S20 is performed. Heat treatment step S20 includes heating step S21 and cooling step S22. In heat treatment step S20, initially, heating step S21 is performed. In heat treatment step S20, cooling step S22 is performed after heating step S21 is performed. Heat treatment step S20 may further include tempering step S23. Tempering step S23 is performed after cooling step S22.

In heat treatment step S20, the workpiece is heated. The workpiece is locally heated. Locally heating the workpiece means that only a vicinity of a surface of the workpiece is a region that is heated. The workpiece can be locally heated in any conventionally well-known method. More specifically, the workpiece can be locally heated for example by using induction heating, laser irradiation, electric heating, or the like.

A temperature in the region that is heated is referred to as a heat treatment temperature. Note that the heat treatment temperature as referred to herein means a surface temperature of a portion of the workpiece that is being heated. The heat treatment temperature can be measured using, for example, a radiation thermometer or the like. The heat treatment temperature is only required to be a temperature equal to or higher than an $A_1$ point. The heat treatment temperature may be a temperature equal to or higher than an $A_3$ point. The heat treatment temperature is preferably the $A_1$ point or higher and 1000° C. or lower. Still preferably, the heat treatment temperature is 900° C. or higher and 1000° C. or lower. Herein, the $A_1$ point is a temperature at which steel starts austenitization, and the $A_3$ point is a temperature at which steel is completely austenitized.

The workpiece is heated in an atmosphere substantially free of hydrogen. An atmosphere substantially free of hydrogen refers to an atmosphere with a concentration of hydrogen of an extent which does not allow hydrogen to penetrate the workpiece when it is heated. For example, the workpiece may be heated in the atmosphere of the air. The workpiece may be heated in an inert gas. The inert gas is, for example, argon (Ar).

When the workpiece is heated in an inert gas, the workpiece is less likely to have a surface with oxide scale formed thereon. When the workpiece has a surface with oxide scale formed thereon, the workpiece may be quenching-cracked and have a poor appearance, a softened surface or the like due to decarburization. When heating step S21 is performed in an inert gas, such a problem as described above can be suppressed.

In cooling step S22, the workpiece is cooled. The workpiece is cooled using any conventionally well-known refrigerant. The refrigerant used for cooling the workpiece is, for example, oil or water.

In cooling step S22, the workpiece may be cooled for example to a temperature equal to or lower than an $M_S$ point. The $M_S$ point is a temperature at which austenitized steel starts martensitization when the steel is cooled. This forms a quench-hardened layer in a heated region of the workpiece.

After cooling step S22 is performed before tempering step S23 is performed the workpiece contains diffusible hydrogen in an amount of 0.1 mass ppm or less. After cooling step S22 is performed before tempering step S23 is performed the workpiece may contain diffusible hydrogen in an amount of 0.06 mass ppm or less.

Diffusible hydrogen refers to hydrogen that can freely diffuse in a crystal lattice of steel. The amount of diffusible hydrogen in the workpiece is measured with a temperature programmed desorption analyzer. More specifically, the amount of diffusible hydrogen in the workpiece is determined as follows: a temperature programmed desorption analyzer is used to perform a temperature programmed desorption analysis in an Ar atmosphere at a temperature increasing rate of 100° C./h within 30 minutes after the completion of cooling step S22 to thus obtain an integral value of an amount of hydrogen released before a temperature of 200° C. is reached.

In tempering step S23, the workpiece is tempered. The workpiece is tempered in a conventionally known method. That is, the workpiece is tempered as follows: the workpiece is heated to a prescribed temperature equal to or lower than the $A_1$ point (hereinafter also referred to as a tempering temperature) and held at the tempering temperature for a prescribed period of time (hereinafter also referred to as a tempering duration).

Tempering step S23 is preferably performed immediately after cooling step S22. Note, however, that tempering step S23 may be performed after a while after cooling step S22 is performed.

Subsequently, post-treatment step S30 is performed. In post-treatment step S30, the workpiece undergoes a post-treatment. In post-treatment step S30, for example, the workpiece is cleaned, and ground, polished or similarly machined or the like. Thus, a bearing component according to the second embodiment is manufactured from the workpiece.

Furthermore, assembling step S40 is performed. In assembling step S40, the bearing component according to the second embodiment is assembled. More specifically, when the bearing component according to the second embodiment is a bearing component, a bearing is manufactured by assembling the bearing component.

Hereinafter, an effect of the bearing component according to the second embodiment and the method for manufacturing the same will be described in comparison with a comparative example. As well as the method for manufacturing a bearing component according to the present embodiment, a method for manufacturing a bearing component according to the comparative example comprises material preparation step S10 and heat treatment step S20.

However, in the method for manufacturing the bearing component according to the comparative example, heating step S21 is performed in an endothermic modified gas. In this respect, the method for manufacturing the bearing component according to the comparative example is different from the method for manufacturing the bearing component according to the second embodiment.

As has been set forth above, the endothermic gas contains hydrogen. As a result, in the method for manufacturing a bearing component according to the comparative example, hydrogen gas penetrates the workpiece. Therefore, the amount of diffusible hydrogen in the workpiece after cooling step S22 before tempering step S23 exceeds 0.1 mass ppm. In this respect, the bearing component according to the comparative example is different from the bearing component according to the second embodiment.

In the method for manufacturing a bearing component according to the comparative example, when tempering step S23 is not performed immediately after cooling step S22 and instead performed after a considerable period of time elapses, then the workpiece may have season cracking due to an effect of diffusible hydrogen in the workpiece.

In the method for manufacturing a bearing component according to the second embodiment, in contrast, the workpiece has a low concentration of diffusible hydrogen. Therefore, even if tempering step S23 is not performed immediately after cooling step S22 and instead performed after a considerable period of time elapses, the workpiece is resistant to season cracking. Therefore, the bearing component and the method for manufacturing the same according to the second embodiment can suppress season cracking without inefficient production.

<Test Conditions and Test Results>

Hereinafter will be described a result of a test conducted to confirm an effect of the bearing component according to the second embodiment and the method for manufacturing the same.

(1) Sample

In this test a sample was used which was a steel ring made of SUJ2 specified in JIS 4805:2008. The steel ring has an outer diameter of 60 mm, an inner diameter of 54 mm, and a width of 15 mm.

(2) Heat Treatment Conditions

When heating was done in an endothermic modified gas in a furnace (hereinafter, this is referred to as a comparative example), it was done at a heat treatment temperature of 850° C. and held for a duration of 30 minutes. When heating was done in an inert gas by inductive heating (hereinafter this is referred to as an example), it was done to 950° C. in about 10 seconds, and thereafter at 950° C. for 15 seconds. After the sample was heated, it was immersed in oil and thus cooled in both case.

(3) Measurement Conditions

After the above heat treatment was performed, each sample was cut into a size of about 35 g. The cut sample was subjected to a temperature programmed desorption analysis in an Ar atmosphere at a temperature increasing rate of 100 K/h to thus obtain an integral value of an amount of hydrogen released before a temperature of 200° C. was reached. Thus, an amount of diffusible hydrogen penetrating the steel ring during the heat treatment was evaluated.

(4) Test Result

Figure 5:
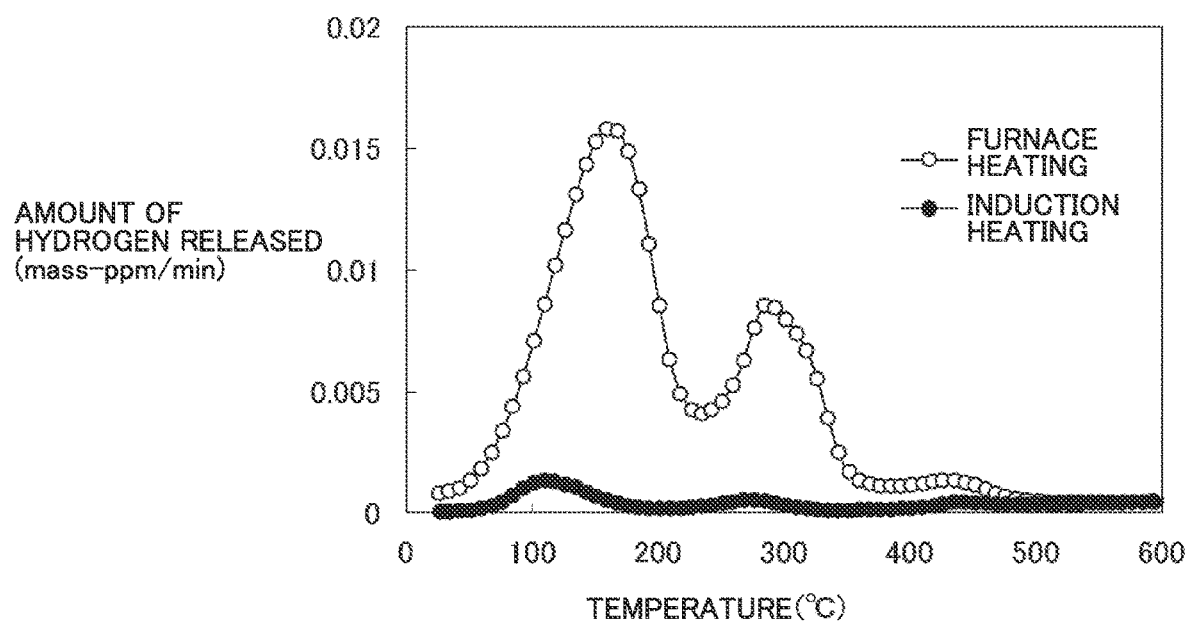
FIG. 5 is a graph showing a result of a measurement of an amount of hydrogen released.

FIG. 5 is a graph showing a result of a measurement of an amount of hydrogen released. As shown in FIG. 5, in the comparative example, an integral value of an amount of hydrogen released before 200° C. was reached was 0.92 mass ppm. In contrast, in the example, an integral value of an amount of hydrogen released before 200° C. was reached was 0.06 mass ppm. Thus it has also been confirmed through an experiment that the bearing component according to the second embodiment and the method for manufacturing the same suppress penetration of diffusible hydrogen into steel during heating, and hence season cracking.

Third Embodiment

Hereinafter, a bearing component according to a third embodiment and a method for manufacturing the same will be described. In the following, difference from the first embodiment will be mainly described, and similar description will not be repeated.

Figure 6:
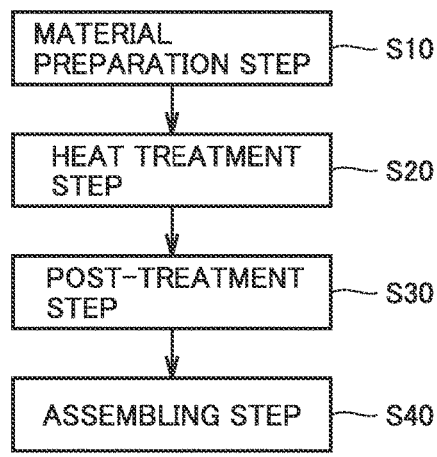
FIG. 6 is a flow chart of a method for manufacturing a bearing component according to a third embodiment.

FIG. 6 is a flow chart of the method for manufacturing a bearing component according to the third embodiment. As shown in FIG. 6, the method for manufacturing a bearing component according to the third embodiment comprises material preparation step S10 and heat treatment step S20. The method for manufacturing a bearing component according to the third embodiment may further comprise post-treatment step S30. The method for manufacturing a bearing component according to the third embodiment may further comprise assembling step S40. In these respects, the method for manufacturing the bearing component according to the third embodiment is the same as the methods for manufacturing the bearing component according to the first and second embodiments.

However, as will be described below, the method for manufacturing the bearing component according to the third embodiment is different from the methods for manufacturing the bearing component according to the first and second embodiments by a specific heat treatment condition of heat treatment step S20.

In heat treatment step S20, a heat treatment is conditioned to satisfy the following expressions 1 and 2:

$$6.600 \times 10^{-4} X^2 - 1.205 X + 5.539 \times 10^2 < Y; \text{ and} \quad \text{Expression 1:}$$

$$1.160 \times 10^{-3} X^2 - 2.094 X + 9.472 \times 10^2 < Y, \quad \text{Expression 2:}$$

where Y (unit: %) represents a carbide area ratio in a component to be worked after heat treatment step S20 and X (unit: ° C.) represents the heat treatment's temperature.

Figure 7:
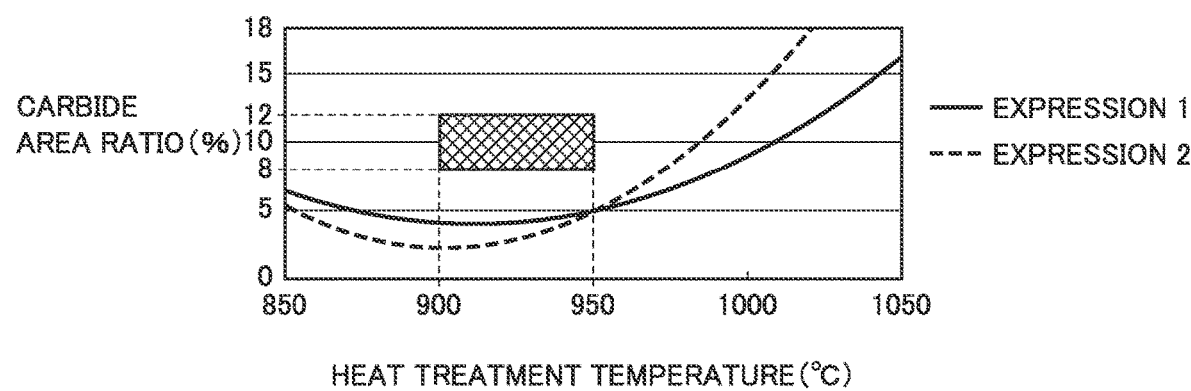
FIG. 7 is a graph showing a relationship between a carbide area ratio and a heat treatment temperature after a heat treatment step is performed.

FIG. 7 is a graph showing a relationship between the carbide area ratio after heat treatment step S20 is performed and the heat treatment temperature. In FIG. 7, the horizontal axis represents heat treatment temperature (unit: ° C.). In FIG. 7, the vertical axis represents carbide area ratio (unit: %).

In the FIG. 7 graph, a solid line represents expression 1 ($6.600 \times 10^{-4} X^2 - 1.205 X + 5.539 \times 10^2 = Y$) and a dotted line represents expression 2 ($1.160 \times 10^{-3} X^2 - 2.094 X + 9.472 \times 10^2 = Y$). The above relationship indicates in FIG. 7 a region upper than the solid line representing expression 1 and the dotted line representing expression 2.

Specifically, in a region where the heat treatment temperature is 900° C. or higher and 950° C. or lower, a region upper than the solid line (representing expression 1) satisfies the above relationship, and in a region where the heat treatment temperature is 950° C. or higher and 1000° C. or lower, a region upper than the dotted line (representing expression 2) satisfies the above relationship. Further, as the above relationship, 900° C.≤X≤950° C. and 8%≤Y≤12% representing a relationship of the carbide area ratio and the heat treatment temperature may be adopted. This relationship is shown in FIG. 7 as a hatched portion.

As well as in the method for manufacturing the bearing component according to the first embodiment, heating step S21 can be done in any method insofar as it is a means for locally heating ring-shaped member 1. For example, induction heating can be used as means for locally heating ring-shaped member 1.

In heating step S21, a heat treatment temperature and a soaking time (a period of time for which the temperature of ring-shaped member 1 is maintained in a determined temperature range including the heat treatment temperature) are determined so as to satisfy the above relationship. Average temperature increasing rate S is set to satisfy the relational expression described in the first embodiment.

Furthermore, before ring-shaped member 1 is cooled when the temperature of ring-shaped member 1 is maintained to fall within the determined temperature range, as described above, the heat treatment temperature may be an average value of the above-indicated surface temperature of ring-shaped member 1 for a period of time for which the temperature of ring-shaped member 1 is maintained to fall within the determined temperature range. (e.g., for a period of time 60 seconds before cooling is started until cooling is started, or a period of time 30 seconds before cooling is started until cooling is started). Before ring-shaped member 1 is cooled when the surface temperature of ring-shaped member 1 varies to some extent (e.g., the surface temperature gradually increases) the heat treatment temperature may be a highest temperature of the surface temperature varying for a determined period of time before cooling is started (e.g., a period of time 60 seconds before cooling is started until cooling is started, or a period of time 30 seconds before cooling is started until cooling is started) (i.e., a highest heating temperature).

The soaking time is for example that period of time after the surface temperature of a portion of ring-shaped member 1 that is heated attains the heat treatment temperature or higher, for which period of time the surface temperature is maintained within a prescribed temperature range including the heat treatment temperature (e.g., a temperature range of the heat treatment temperature ±30° C.) (more preferably, a period of time for which the surface temperature is maintained within a prescribed temperature range of not less than the heat treatment temperature). Practically, the soaking time can be a period of time after the surface temperature of the heated portion of ring-shaped member 1 reaches the heat treatment temperature or higher before cooling ring-shaped member 1 is started.

Figure 8:
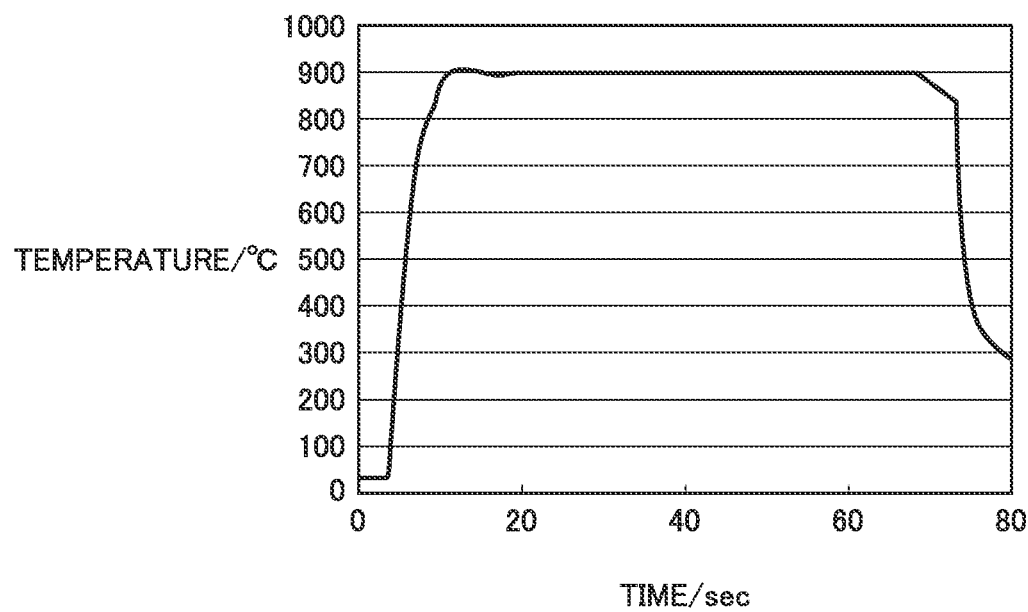
FIG. 8 is a graph showing an example of a heat pattern in a heat treatment step in the method for manufacturing the bearing component according to the third embodiment.
Figure 9:
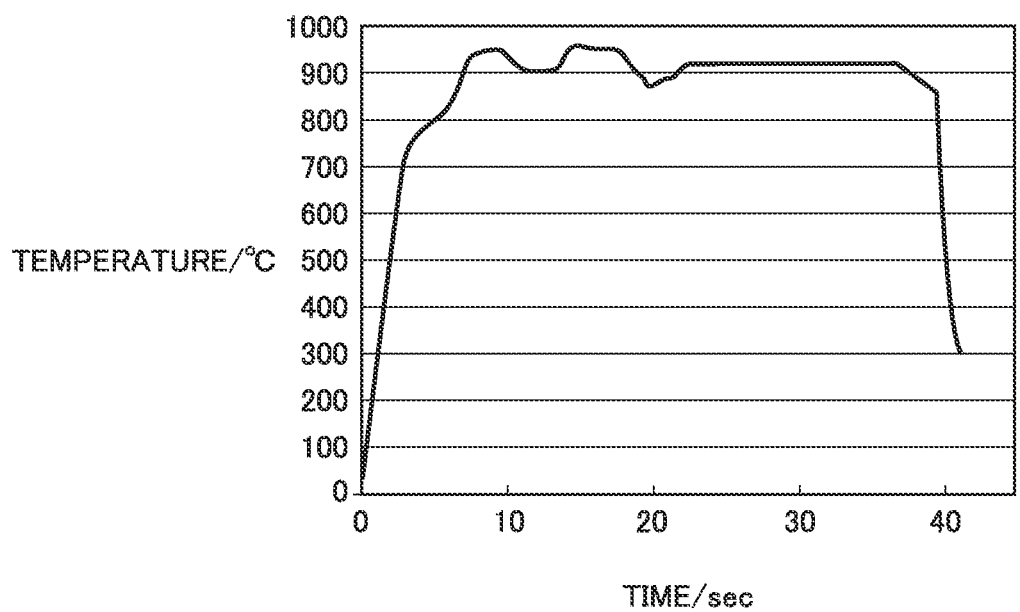
FIG. 9 is a graph showing another example of a heat pattern in a heat treatment step in the method for manufacturing the bearing component according to the third embodiment.

FIG. 8 is a graph showing an example of a heat pattern in heating step S21 in the method for manufacturing the bearing component according to the third embodiment. FIG. 9 is a graph showing another example of the heat pattern in heating step S21 in the method for manufacturing the bearing component according to the third embodiment. In FIGS. 8 and 9, the horizontal axis represents time (unit: seconds), and the vertical axis represents heat treatment temperature (unit: ° C.). FIG. 8 shows a case in which the heat treatment temperature is 900° C. and the soaking time is about 60 seconds. FIG. 8 shows a case in which the heat treatment temperature during the soaking time substantially has a set value. FIG. 9 shows a case in which the soaking time is about 30 seconds and the heat treatment temperature during the soaking time fluctuates to some extent.

Cooling step S22 in the method for manufacturing a bearing component according to the third embodiment is the same as the method for manufacturing a bearing component according to the first embodiment. That is, in the method for manufacturing a bearing component according to the third embodiment, cooling step S22 is performed to cool ring-shaped member 1. Ring-shaped member 1 is cooled using any conventionally well-known refrigerant. Ring-shaped member 1 may be cooled to a temperature equal to or lower than the $M_S$ point, for example.

Induction heating can easily activate and deactivate a heating device. Therefore, induction heating is suitable for production of bearing components in small lots. Therefore, in the method for manufacturing a bearing component according to the third embodiment, when induction heating is used as a means for locally heating ring-shaped member 1, bearing components having a quality equal to or higher than that obtained when an atmosphere furnace heat treatment is used can be easily manufactured in small lots.

In the method for manufacturing a bearing component according to the third embodiment, the steel constituting a component to be worked may be high carbon chromium bearing steel. A bearing component composed of high carbon chromium bearing steel ensures a quality after a heat treatment that is equivalent to or higher than a quality in a case using the atmosphere furnace heat treatment.

In the method for manufacturing a bearing component according to the third embodiment, heat treatment step S20 may be performed with a heat treatment conditioned to satisfy the following relationship:

$900° C. \leq X \leq 950° C.$; and $8\% \leq Y \leq 12\%$.

This ensures that ring-shaped member 1 after the heat treatment has a quality equivalent to or higher than a quality in a case using the atmosphere furnace heat treatment.

<Basic Concept of Derivation of Condition for Heat Treatment>

According to a study by the present inventors, a heat treatment method by performing local heating such as induction heating have differences from a heat treatment method by performing an atmosphere furnace heat treatment, and, of the differences, there are two differences considered to affect bearing characteristics. A first difference is that induction heating is high-temperature, short-time heating. A second difference is that it is theoretically difficult for induction heating to dissolve carbon in a bearing component in a uniform amount and an amount of carbon dissolved (or an amount of solid solution of carbon) varies in the bearing component.

Variation in amount of solid solution of carbon in a bearing component is expected to affect the bearing component's secular, dimensional stability, static load capacity, and fracture value. Accordingly, when the upper and lower limits of the amount of solid solution of carbon that allow these characteristics values to be equivalent to or higher than those of a product obtained through the atmosphere furnace heat treatment are investigated, they can be regarded as a range in concentration of solid solution of carbon tolerable in the bearing component.

The heat treatment temperature is also expected to affect the above characteristics. Accordingly, the heat treatment temperature's tolerable range is determined by investigating a range of the heat treatment temperature allowing these characteristics values to be equivalent to or higher than those of a product obtained through the atmosphere furnace heat treatment.

By using the range of the amount of solid solution of carbon and the range of the heating temperature as described above, it can be determined that a bearing component has a quality equivalent to or higher than that of a product obtained through the atmosphere furnace heat treatment when the entire bearing component falls within the ranges. Accordingly, how the amount of solid solution of carbon and the heat treatment temperature affect bearing characteristics was investigated and a condition allowing a quality equivalent to that of a product obtained through an atmosphere furnace heat treatment was obtained through the following test:

Note that it is difficult to directly measure an amount of solid solution of carbon. Accordingly, a carbide area ratio of ring-shaped member 1 (or a bearing component) after the heat treatment was used as an alternative index. An approximate amount of solid solution of carbon can be calculated from the carbide area ratio.

<Sample Used for Deriving a Heat Treatment Condition>

(1) Sample

The test was conducted using a sample of a material having chemical components as shown in a table below:

TABLE 1

| C | Si | Mn | P | S | Ni | Cr | Mo | Cu | Al | $O_2$ |
|---|---|---|---|---|---|---|---|---|---|---|
| 0.98 | 0.27 | 0.42 | 0.011 | 0.007 | 0.06 | 1.47 | 0.03 | 0.08 | 0.035 | 5 ppm |

Assuming that the material of the chemical components as above provides any carbide all composed of $Fe_3C$, when a carbide area ratio before the heat treatment is calculated from the above carbon concentration, the carbide area ratio will be 15.1%.

(2) Heat Treatment Method

For the material used in the following test, test levels for the carbide area ratio were set to 4%, 8% and 12%. Furthermore, test levels for the heating temperature were set to 900° C., 950° C., and 1000° C. Note that heat treatment periods of time (or soaking periods of time) at each heating temperature to allow the above material to have carbide area ratios of 4%, 8% and 12% are as shown in Table 2 below.

TABLE 2

| heating temperature | carbide area ratio | | |
|---|---|---|---|
| [° C.] | 4% | 8% | 12% |
| 900 | 316 s | 57.5 s | 11 s |
| 950 | 65 s | 14.5 s | 3.0 s |
| 1000 | 10.3 s | 4.0 s | 0.7 s |

Table 2 indicates a heat treatment time (unit: seconds) necessary for obtaining a prescribed carbide area ratio when each heating temperature is adopted. For example, as shown in Table 2, when the heating temperature is 900° C., a heat treatment time of 316 seconds is required to obtain a carbide area ratio of 4%.

In order to achieve the above carbide area ratios in the sample used in the test, the following heat treatment was performed. The sample used in the test was ring-shaped member 1 made of SUJ2 specified in JIS 4805:2008. Ring-shaped member 1 has an outer diameter D of 60.3 mm, an inner diameter d of 53.7 mm, a width T of 15.3 mm, and a thickness W of 3.3 mm.

Heating step S21 was performed by induction heating using a single-turn coil. The single-turn coil was connected to a power supply (for supplying power to the single-turn coil) providing an output, which was controlled through a feedback of the measured temperature of a surface of the steel ring (i.e., a surface of a portion thereof inductively heated by the single-turn coil). The temperature of the surface of the steel ring was raised from room temperature to a prescribed temperature (specifically, 900° C., 950° C. or 1000° C.). Note that a period of time of about 5 seconds was required from when the heat treatment started to when the steel ring's surface attained the above prescribed temperature.

After the steel ring's surface attained the prescribed temperature, the power supplied to the single-turn coil was controlled so that the ring was held at the prescribed temperature for a specific period of time (i.e., the heat treatment time) (or underwent a soaking step).

Thereafter, cooling step S22 was performed to cool the steel ring. This was done by immersing the steel ring in oil at a temperature of 70° C. (i.e., quenching it). A heat pattern for such a heat treatment can for example be the heat pattern shown in FIG. 7.

After cooling step S22, tempering step S23 was performed. The tempering was done under standard conditions, i.e., a tempering temperature of 180° C. and a tempering duration of 2 hours.

<Secular, Dimensional Stability Test>

While a bearing is used, it dimensionally varies as retained austenite is decomposed. Dimensional variation impairs the bearing in precision, and accordingly, it is required to be of a prescribed level or smaller.

(1) Sample

After heat treatment step S20, the sample was polished to prepare a ring-shaped sample having an outer diameter of 60 mm, an inner diameter of 54 mm, and an axial width of 15 mm. As the sample, nine types of samples were prepared in view of combinations of the heating temperatures in the heat treatment described above (i.e., 900° C., 950° C., 1000° C.) and the carbide area ratios as indicated in Table 2.

(2) Test and Result

The nine types of samples described above underwent a treatment such that they were heated at a temperature of 230° C. and held for 2 hours and how they varied in external dimension between before and after the treatment was measured. A result thereof is shown in table 3.

TABLE 3

| soaking temperature [° C.] | carbide area ratio [%] | rate of change in dimension [×10$^{-5}$] | assessment |
|---|---|---|---|
| 900 | 4 | 71 | NG |
|  | 8 | 36 | OK |
|  | 12 | 19 | OK |
| 950 | 4 | 78 | NG |
|  | 8 | 47 | OK |
|  | 12 | 35 | OK |
| 1000 | 4 | 82 | NG |
|  | 8 | 77 | NG |
|  | 12 | 59 | OK |

Note that a rate of change in dimension as referred to herein is defined as (an absolute value of $D_1-D_0$)/$D_0$, where $D_0$ represents the outer diameter of a sample before the treatment and $D_1$ represents the outer diameter of the sample after the treatment. The outer diameter of the sample was measured at the same location before and after the sample was held at high temperature. The measurements of the outer diameters were evaluated in two directions crossing at 90° when viewed from the center of the ring-shaped sample. Furthermore, n=3 for each level.

In Table 3, a rate of change in dimension of less than $70 \times 10^{-5}$ was regarded as being equivalent to or better than that of a product obtained through the atmosphere furnace heat treatment, and thus accepted (indicated as "OK"). In table 3, a rate of change in dimension of $70 \times 10^{-5}$ or larger was rejected (indicated as "NG"). As can be seen from Table 3, a sample which can ensure secular dimensional stability equivalent to or better than that of a product obtained through the atmosphere furnace heat treatment has carbide area ratios of 8% and 12% for heat treatment temperatures of 900° C. and 950° C. and a carbide area ratio of 12% for a heat treatment temperature of 1000° C.

Further, an approximate function is obtained from the above test data and a condition allowing a rate of change in dimension to be less than $70 \times 10^{-5}$ is obtained, as follows: carbide area ratios of 4.0% or more, 4.8% or more and 8.9% or more for heat treatment temperatures of 900° C., 950° C. and 1000° C., respectively.

<Static Load Capacity Test>

When a large load acts on a bearing, the bearing is plastically deformed. To allow the bearing to have rolling elements rolled smoothly, however, the rolling element's plastic deformation is required to be 1/10000 or less of the diameter of the rolling element.

(1) Sample

A sample having a size of 6 mm in length×15 mm in width×3 mm in thickness was prepared by polishing and wire-cutting the ring having undergone heat treatment step S20. The sample had a surface of 6 mm×15 mm mirror-polished. Similarly as done for the above-described secular dimensional stability test, nine types of samples were prepared in view of combinations of heating temperatures and carbide area ratios.

For comparison, a sample of a comparative example was also prepared as follows: a sample having the same composition underwent an atmosphere furnace heat treatment as a heat treatment and was subsequently machined to provide a sample of a similar size.

(2) Test and Result

A ⅜-inch ceramic ball was pressed against the sample on the mirror-polished surface with a determined test load applied thereto. The surface was plastically deformed and thus had an indentation, and a depth thereof was evaluated. The test load was set to 471 N corresponding to Pmax 4 GPa of Hertz contact. Further, for each level, n=3. A result of the test is shown in Table 4.

TABLE 4

| soaking temperature [° C.] | carbide area ratio [%] | indentation depth [μm] | standard deviation [μm] | assessment |
|---|---|---|---|---|
| 900 | 4 | 0.18 | 0.0154 | NG |
|  | 8 | 0.13 | 0.0058 | OK |
|  | 12 | 0.12 | 0.0176 | — |
| 950 | 4 | 0.23 | 0.0243 | NG |
|  | 8 | 0.17 | 0.0045 | OK |
|  | 12 | 0.16 | 0.0111 | OK |
| 1000 | 4 | 0.34 | 0.0510 | NG |
|  | 8 | 0.26 | 0.0193 | NG |
|  | 12 | 0.23 | 0.0282 | NG |
| atmosphere heat treatment |  | 0.19 | 0.0004 |  |

In Table 4, the column "indentation depth" indicates an average value of a plurality of indentation depths measured for each sample. In Table 4, the column "standard deviation" indicates a standard deviation of data of the indentation depths. In Table 4, the column "assessment" indicates, with reference to a significance level of 95%, acceptance (OK) for a sample less easily indented than a sample obtained through the atmosphere furnace heat treatment and failure (NG) for a sample more easily indented than the sample obtained through the atmosphere furnace heat treatment. For a sample that does not meet the above criterion, "-" is indicated in the column "assessment."

From this result, it can be seen that the samples indicated as "OK" or "-" exhibit a static load capacity equivalent to or higher than that of a product obtained through the atmosphere furnace heat treatment. More specifically, samples having carbide area ratios of 8% and 12% for heat treatment temperatures of 900° C. and 950° C. exhibit a static load capacity equivalent to or higher than that of the product obtained through the atmosphere furnace heat treatment.

Further, an approximate function is obtained from the above test data and in a case with a standard deviation set to 0.015 μm a range is calculated which can ensure a quality equivalent to or higher than that of the product obtained through the atmosphere furnace heat treatment, as follows: carbide area ratios of 2.2% or more, 4.8% or more and 13.2% or more for heat treatment temperatures of 900° C., 950° C. and 1000° C., respectively.

<Fracture Strength Test>

A bearing may be required to have fracture strength, and accordingly, a test was conducted as follows:

(1) Sample

A sample having undergone heat treatment step S20 was polished to prepare a ring-shaped sample having an outer diameter of 60 mm, an inner diameter of 54 mm, and an axial width of 15 mm. As the sample, nine types of samples were prepared in view of combinations of the heating temperatures in the heat treatment described above (i.e., 900° C., 950° C., and 1000° C.) and the carbide area ratios as indicated in Table 2. Further, for each level, n=3.

For comparison, a sample of a comparative example was also prepared as follows: a sample having the same composition underwent an atmosphere furnace heat treatment as a heat treatment and was subsequently machined to provide a sample of a similar size.

(2) Test and Result

Each sample was radially sandwiched and a load was applied thereto at a constant rate, and a load leading to fracture was measured. Furthermore, from the load, fracture stress was calculated. A result thereof is shown in Table 5.

TABLE 5

| soaking temperature [° C.] | carbide area ratio [%] | fracture strength [MPa] | standard deviation [MPa] | assessment |
|---|---|---|---|---|
| 900 | 4 | 2270 | 160 | NG |
| 900 | 8 | 2490 | 151 | — |
| 900 | 12 | 2760 | 219 | — |
| 950 | 4 | 2123 | 135 | NG |
| 950 | 8 | 2534 | 182 | — |
| 950 | 12 | 2680 | 272 | — |
| 1000 | 4 | 2022 | 143 | NG |
| 1000 | 8 | 2221 | 175 | NG |
| 1000 | 12 | 2373 | 222 | NG |
| atmosphere furnace heat treatment |  | 2608 | 121 |  |

In Table 5, the column "assessment" indicates failure (NG) for a sample having, even with the standard deviation considered, a fracture strength smaller than that of a product obtained through the atmosphere furnace heat treatment and indicates "-" for a sample capable of ensuring, with the standard deviation considered, a fracture strength equivalent to or larger than that of the product obtained through the atmosphere furnace heat treatment.

From this result, it can be seen that any sample with "-" indicated in the column "assessment" can exhibit a fracture strength equivalent to or larger than that of the product obtained through the atmosphere furnace heat treatment. More specifically, samples having carbide area ratios of 8% and 12% for heat treatment temperatures of 900° C. and 950° C. can exhibit a fracture strength equivalent to or larger than that of the product obtained through the atmosphere furnace heat treatment.

Further, an approximate function is obtained from the above test data and in a case with a standard deviation set to 150 MPa a range is calculated which can ensure a quality equivalent to or higher than that of the product obtained through the atmosphere furnace heat treatment, as follows: carbide area ratios of 4.0% or more, 5.4% or more and 9.3% or more for heat treatment temperatures of 900° C., 950° C. and 1000° C., respectively.

<Studying Heat Treatment Conditions>

From the above results, it has been found that when a high-temperature short-time heating means such as induction heating is employed to quench high-carbon chromium bearing steel such as SUJ 2 specified in JIS4805:2008, a level of performance equivalent to or higher than that of a product obtained through the atmosphere furnace heat treatment can be ensured in a case with heat treatment temperatures of 900° C. and 950° C. and carbide area ratios of 8% and 12%.

When looking at each data, any of the test results monotonically increases or decreases with respect to the heat treatment temperature and the carbide area ratio. Accordingly, it is believed that a quality equivalent to or higher than that of the product obtained through the atmosphere furnace heat treatment can also be achieved by a heat treatment condition corresponding to the region surrounded by the four points obtained this time (i.e., the hatched region indicated in FIG. 7).

Thus, a quality equivalent to or higher than that of the product obtained through the atmosphere furnace heat treatment can be ensured in a region with a heat treatment temperature of 900° C. or higher and 950° C. or lower and a carbide area ratio of 8% or more and 12% or less.

Table 6 shows a range of a carbide area ratio which allows a quality equivalent to or higher than that of the product obtained through the atmosphere furnace heat treatment, as obtained from an approximate function of each test result.

TABLE 6

| temperature [° C.] | carbide area ratio with secular dimensional variation considered [%] | carbide area ratio with static load capacity considered [%] | carbide area ratio with fracture strength considered [%] |
|---|---|---|---|
| 900 | >4.0 | >2.2 | >4.0 |
| 950 | >4.8 | >4.8 | >5.4 |
| 1000 | >8.9 | >13.2 | >9.3 |

Regarding a relationship between carbide area ratio range and heat treatment temperature shown in Table 6, an approximate function is obtained as follows:

for secular dimension, $$6.600 \times 10^{-4} X^2 - 1.205 X + 5.539 \times 10^2 < Y \quad \text{(conditional expression 1)},$$

for static load capacity, $$1.160 \times 10^{-3} X^2 - 2.094 X + 9.472 \times 10^2 < Y \text{(conditional expression 2), and}$$

for fracture test, $$5.000 \times 10^{-4} X^2 - 8.970 \times 10^{-1} X + 4.063 \times 10^2 < Y \text{(conditional expression 3)},$$

where Y represents carbide area ratio (%) and X represents heat treatment temperature (° C.).

And a range which ensures a quality equivalent to or higher than that of the product obtained through the atmosphere furnace heat treatment is a case with heat treatment temperature X in a range of 900° C. or higher and 1000° C. or lower with carbide area ratio Y satisfying the above conditional expressions 1 to 3.

Herein, with a heat treatment temperature in the range of 900° C. or higher and 1000° C. or lower, X satisfying the conditional expression 1 always satisfies the conditional expression 3. Accordingly, the conditional expression 3 may not be taken into consideration. Accordingly, a range which ensures a quality equivalent to or higher than that of the product obtained through the atmosphere furnace heat treatment is a case with a heat treatment temperature in a range of 900° C. or higher and 1000° C. or lower with carbide area ratio Y satisfying the conditional expressions 1 and 2.

While embodiments of the present invention have been described as above, the embodiments can also be variously modified. Further, the present invention is not limited in scope to the above-described embodiments. The scope of the present invention is defined by the terms of the claims, and is intended to include any modifications within the meaning and scope equivalent to the terms of the claims.

INDUSTRIAL APPLICABILITY

The above embodiments are particularly advantageously applied to bearing components using induction heating, and manufacturing the same.

REFERENCE SIGNS LIST

1: ring-shaped member; 11: radially outer surface; 12: radially inner surface; 13: top surface; 14: bottom surface; S10: material preparation step; S20: heat treatment step; S21 heating step; S22: cooling step; S23: tempering step; S30: post-treatment step; S40: assembling step; D: outer diameter; d: inner diameter; T: width; W: thickness; S: average temperature increasing rate; X: heat treatment temperature; Y: carbide area ratio.

The invention claimed is:

1. A method for manufacturing a bearing component, comprising:
   a step of preparing a workpiece of steel, wherein the workpiece of steel is a ring-shaped member having a radially inner surface, a radially outer surface, and a thickness which is a distance between the radially inner surface and the radially outer surface; and
   a heat treatment step of performing a heat treatment to locally heat the workpiece to a heat treatment temperature in an atmosphere substantially free of hydrogen, subsequently cool the workpiece and temper the workpiece, wherein:
   the steel composing the workpiece is high carbon chromium bearing steel SUJ2 defined by JIS4805:2008,
   a carbide area ratio after the heat treatment is 8% or more and 12% or less, and the heat treatment temperature is 900° C. or more and 950° C. or less, and
   a rate of change in dimension of the ring-shaped member after the heat treatment is less than or equal to $70 \times 10^{-5}$.

2. The method for manufacturing a bearing component according to claim 1, wherein:
   in the heat treatment, one of the radially inner surface and the radially outer surface is heated to the heat treatment temperature, subsequently cooled, and tempered,
   the heat treatment satisfies $S \geq 930/(0.3477\ W^2 - 1.594\ W - 0.804)$, where S represents an average temperature increasing rate obtained by dividing the heat treatment temperature by a time required to reach the heat treatment temperature from room temperature, and W represents the thickness, where unit of S is ° C./sec and unit of W is mm, and
   the thickness W is 8 mm or more and 100 mm or less.

3. The method for manufacturing a bearing component according to claim 1, wherein in the heat treatment step the workpiece is heated in an inert gas.

4. The method for manufacturing a bearing component according to claim 1, wherein
   after the workpiece is cooled before the tempering is performed the workpiece contains diffusible hydrogen in an amount of 0.1 mass ppm or less.

5. The method for manufacturing a bearing component according to claim 1, wherein in the heat treatment step, the workpiece is heated by induction heating.

6. The method for manufacturing a bearing component according to claim 2, wherein in the heat treatment step, the ring-shaped member is heated by induction heating.

\* \* \* \* \*